(12) United States Patent
Park et al.

(10) Patent No.: US 11,818,751 B2
(45) Date of Patent: Nov. 14, 2023

(54) METHOD AND APPARATUS FOR DETERMINING TRANSMISSION PRIORITY BETWEEN RELAY DATA AND UPLINK PHYSICAL SIGNAL IN NR V2X

(71) Applicant: LG Electronics Inc., Seoul (KR)

(72) Inventors: Giwon Park, Seoul (KR); Seoyoung Back, Seoul (KR); Seungmin Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 17/376,503

(22) Filed: Jul. 15, 2021

(65) Prior Publication Data

US 2022/0022210 A1  Jan. 20, 2022

(30) Foreign Application Priority Data

Jul. 16, 2020 (KR) ......................... 10-2020-0088045
Jul. 20, 2020 (KR) ......................... 10-2020-0089786
Jul. 24, 2020 (KR) ......................... 10-2020-0092101
Jul. 24, 2020 (KR) ......................... 10-2020-0092105

(51) Int. Cl.
  *H04W 72/566* (2023.01)
  *H04W 88/04* (2009.01)
  *H04W 72/20* (2023.01)
  *H04W 4/40* (2018.01)

(52) U.S. Cl.
  CPC ......... *H04W 72/569* (2023.01); *H04W 72/20* (2023.01); *H04W 72/566* (2023.01); *H04W 88/04* (2013.01); *H04W 4/40* (2018.02)

(58) Field of Classification Search
  CPC ........ H04W 72/1242; H04W 72/1247; H04W 72/1278; H04W 88/04; H04W 72/1205; H04W 72/12; H04W 72/569; H04W 72/20; H04W 72/56605; H04W 4/40; H04W 72/566
  See application file for complete search history.

(56) References Cited

U.S. PATENT DOCUMENTS

| | | | |
|---|---|---|---|
| 2018/0054237 A1* | 2/2018 | Tseng | H04W 72/085 |
| 2018/0152915 A1* | 5/2018 | Kalhan | H04W 88/04 |
| 2019/0166640 A1* | 5/2019 | Wei | H04W 76/14 |
| 2020/0053743 A1* | 2/2020 | Cheng | H04L 5/0048 |
| 2021/0022184 A1* | 1/2021 | Hosseini | H04W 72/0473 |
| 2021/0029723 A1* | 1/2021 | Wu | H04W 72/1242 |
| 2022/0014338 A1* | 1/2022 | Yoshioka | H04L 5/0057 |
| 2022/0046640 A1* | 2/2022 | Tang | H04L 5/0037 |

FOREIGN PATENT DOCUMENTS

| | | | | |
|---|---|---|---|---|
| WO | WO-2018208114 A1 * | 11/2018 | ........ | H04W 72/0493 |
| WO | WO-2021239135 A1 * | 12/2021 | | |

\* cited by examiner

*Primary Examiner* — Un C Cho
*Assistant Examiner* — Lalita W Pace
(74) *Attorney, Agent, or Firm* — BRYAN CAVE LEIGHTON PAISNER LLP

(57) ABSTRACT

A method of operating a first apparatus 100 in a wireless communication system is proposed. The method may include: receiving a value related to priority of first data and the first data from a second apparatus 200; determining data to be transmitted based on a first resource, by comparing a threshold related to relay communication and the value related to the priority of the first data; and transmitting the determined data to a base station 300.

12 Claims, 20 Drawing Sheets

(a)  (b)  (c)

● : TX UE
⊘ : RX UE

METHOD AND APPARATUS FOR DETERMINING TRANSMISSION PRIORITY BETWEEN RELAY DATA AND UPLINK PHYSICAL SIGNAL IN NR V2X

CROSS-REFERENCE TO RELATED APPLICATIONS

Pursuant to 35 U.S.C. § 119(a), this application claims the benefit of Korean Patent Applications Nos. 10-2020-0088045 filed on Jul. 16, 2020, 10-2020-0089786 filed on Jul. 20, 2020, 10-2020-0092101 filed on Jul. 24, 2020 and 10-2020-0092105 filed on Jul. 24, 2020, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Solutions

According to an embodiment, a method of operating the first device 100 in a wireless communication system is proposed. The method may include, receiving a value related to priority of first data and the first data from a second apparatus 200; determining data to be transmitted based on a first resource, by comparing a threshold related to relay communication and the value related to the priority of the first data; and transmitting the determined data to a base station 300.

Effects of the Disclosure

The user equipment (UE) may efficiently perform SL communication.

DESCRIPTION OF EXEMPLARY EMBODIMENTS

Figure 1:
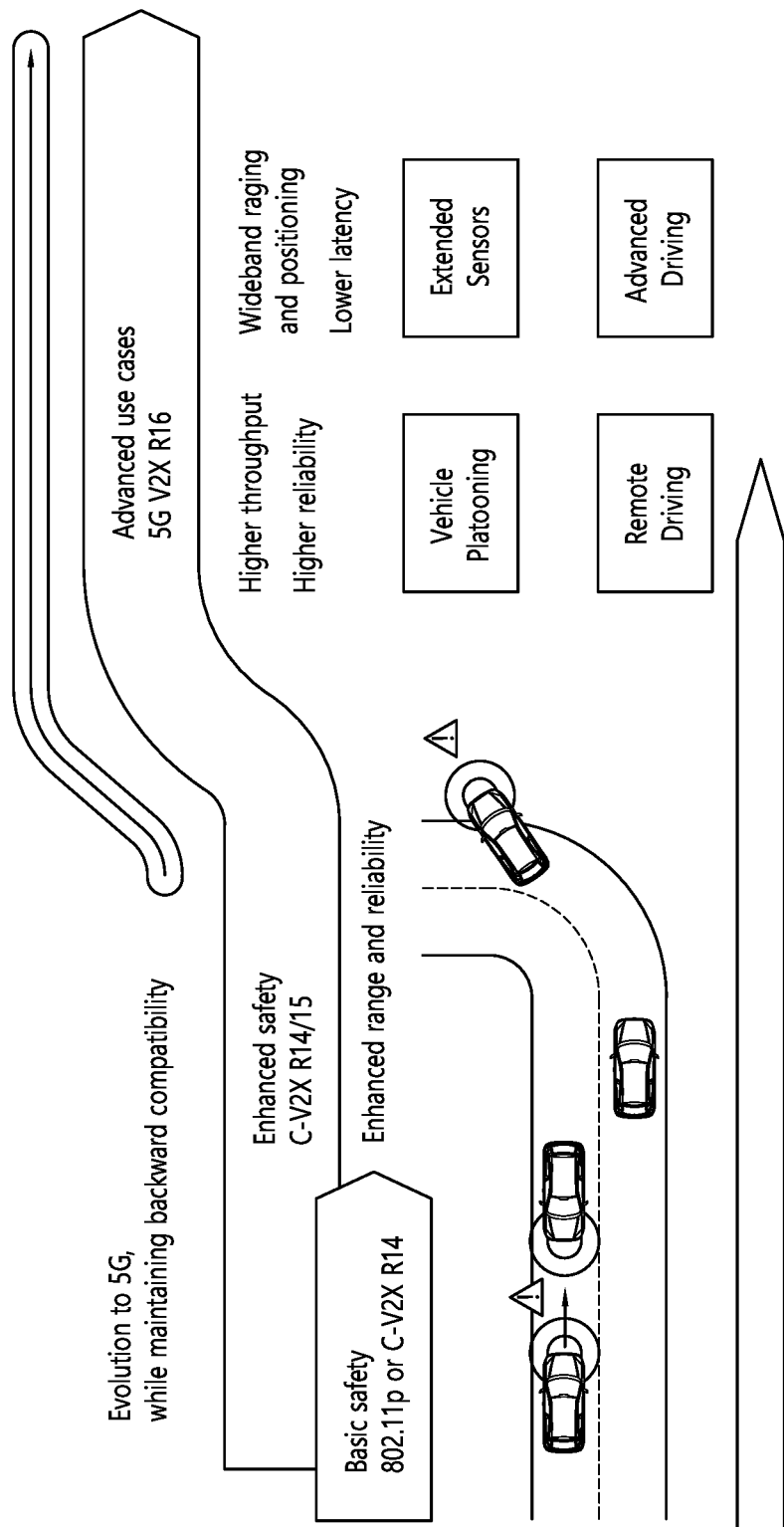
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
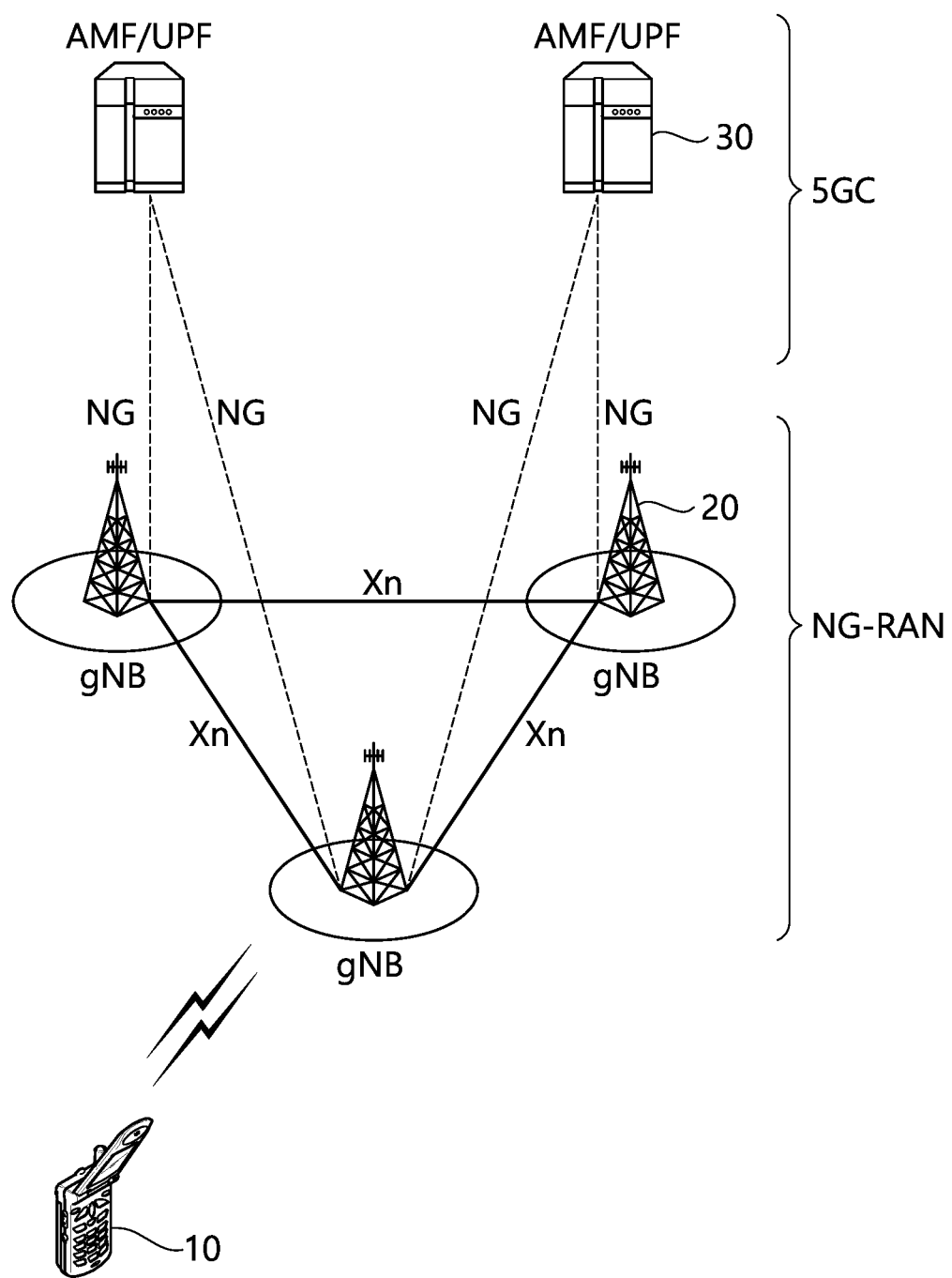
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
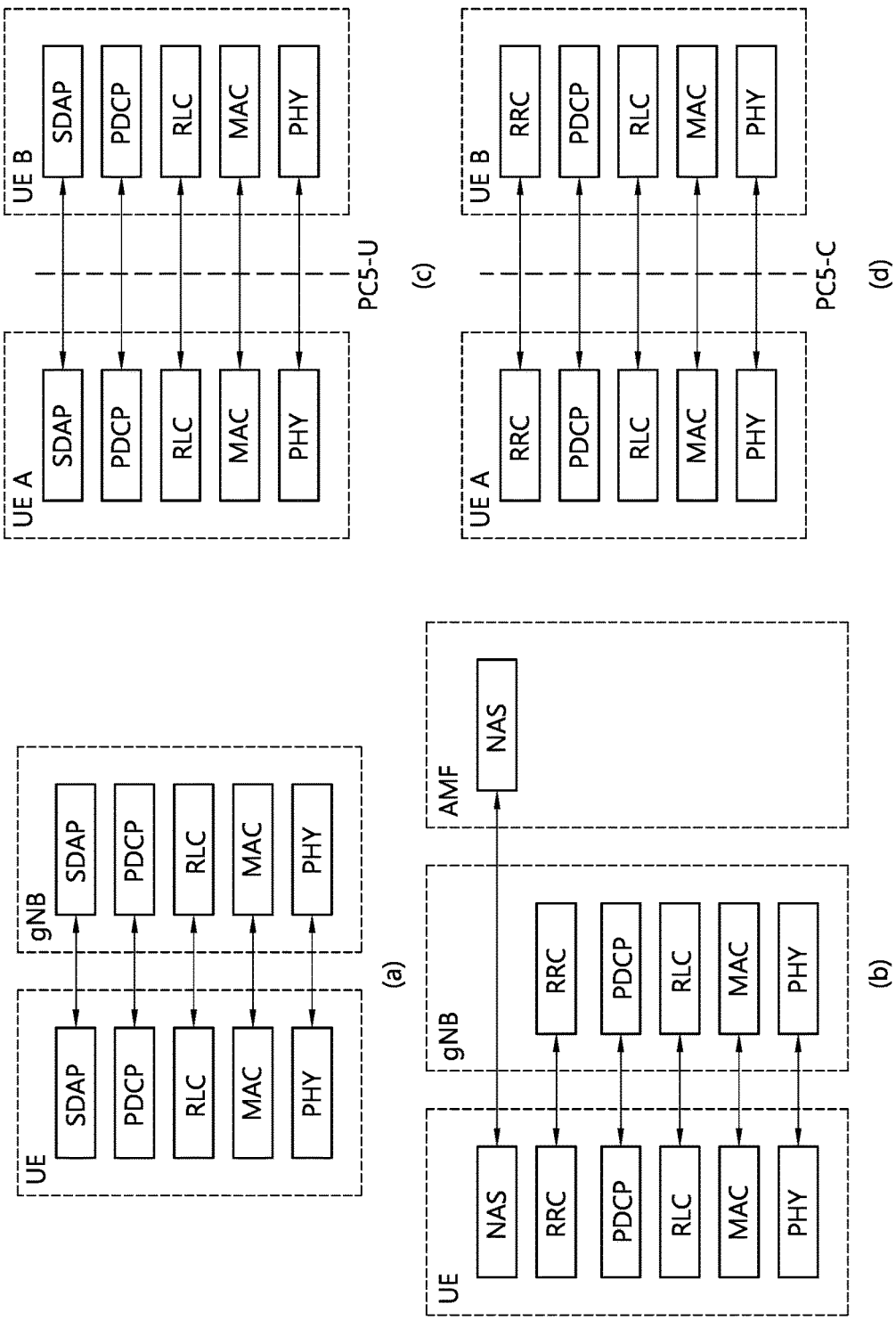
FIG. 3 shows a radio protocol architecture, in accordance with an embodiment of the present disclosure.

FIG. 3 shows a radio protocol architecture, in accordance with an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
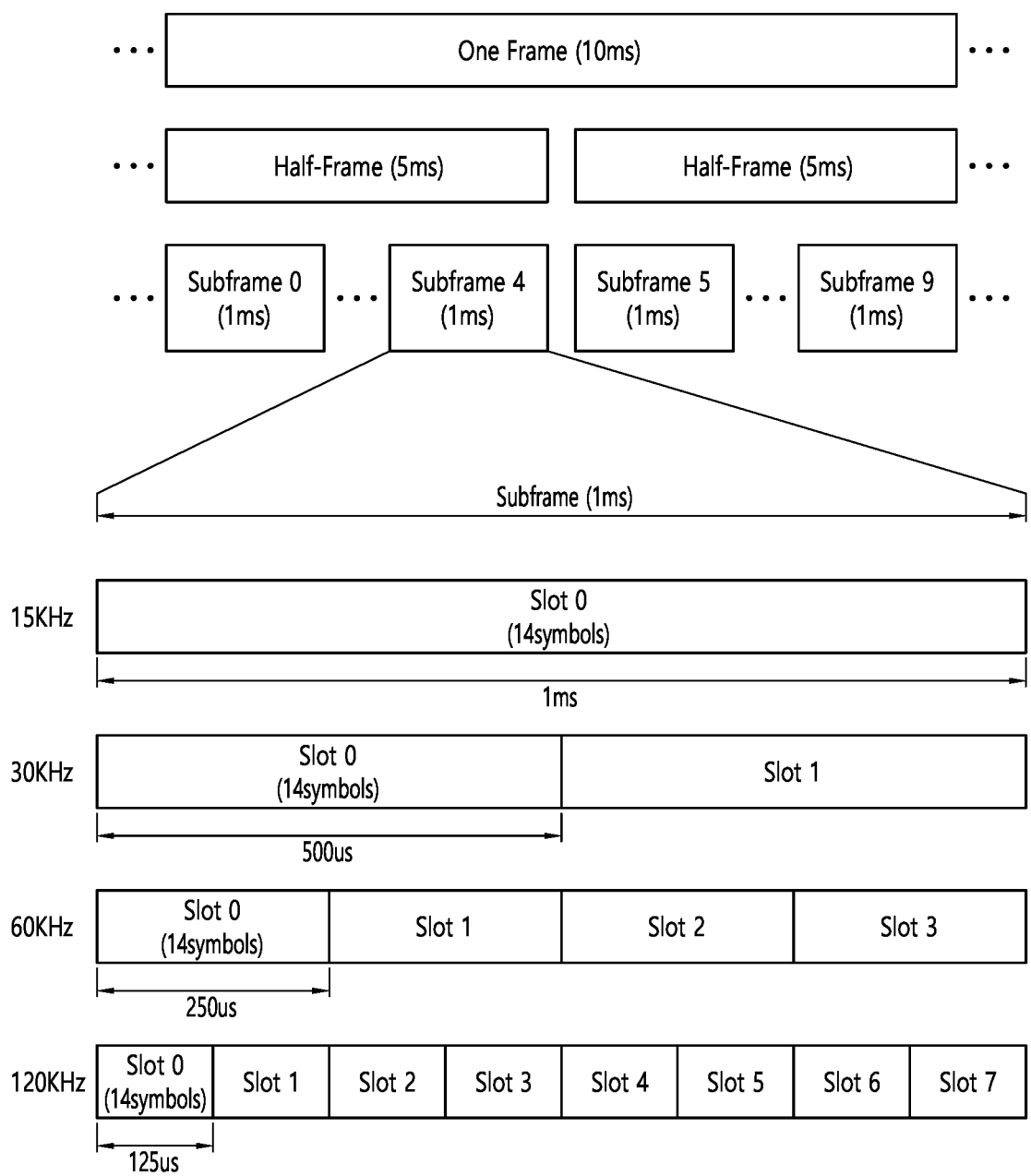
FIG. 4 shows a structure of a radio frame of an NR, in accordance with an embodiment of the present disclosure.

FIG. 4 shows a structure of a radio frame of an NR, in accordance with an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
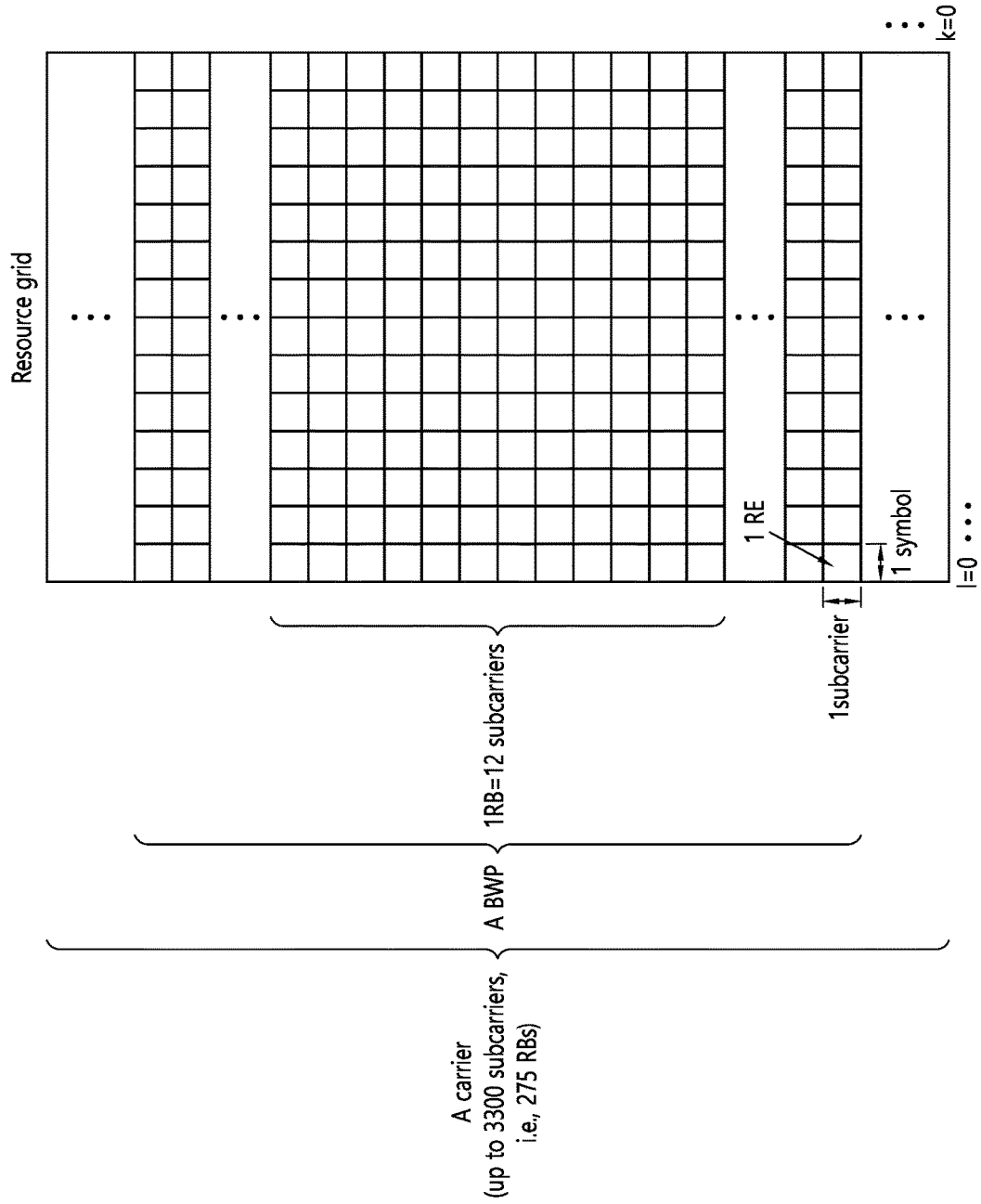
FIG. 5 shows a structure of a slot of an NR frame, in accordance with an embodiment of the present disclosure.

FIG. 5 shows a structure of a slot of an NR frame, in accordance with an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
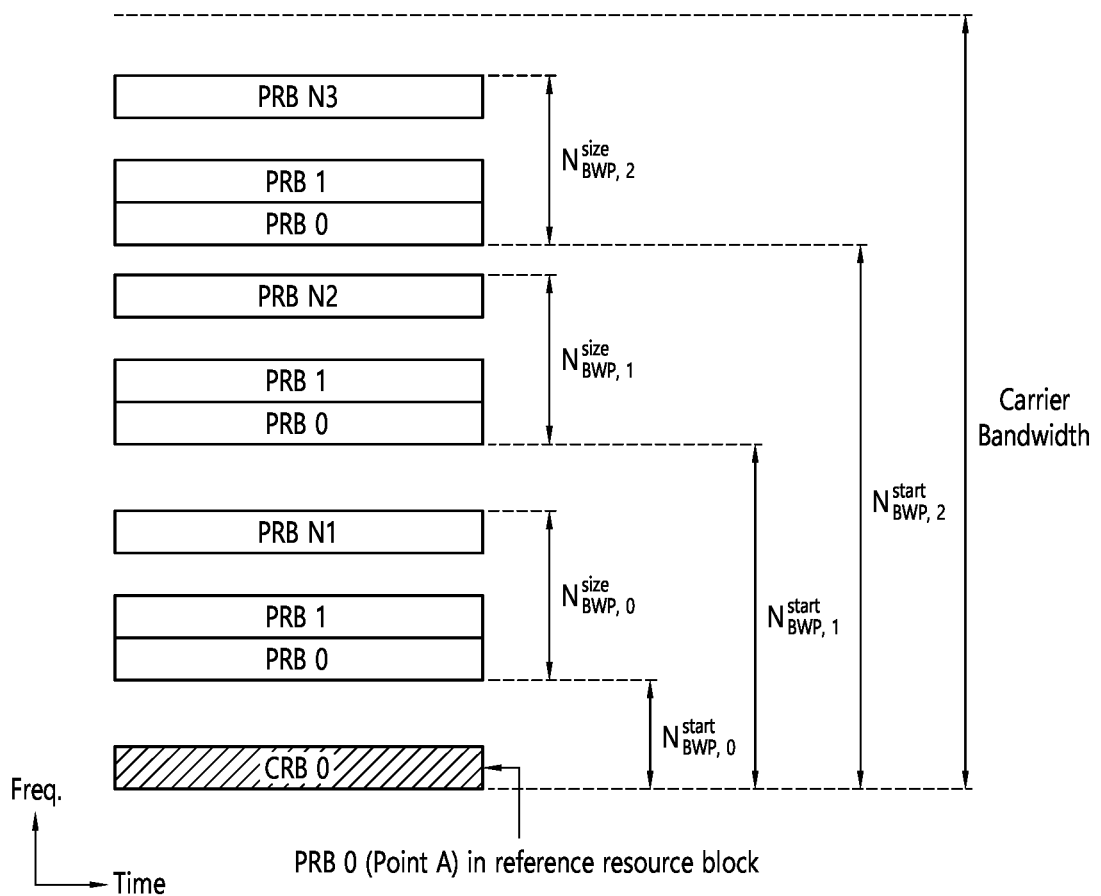
FIG. 6 shows an example of a BWP, in accordance with an embodiment of the present disclosure.

FIG. 6 shows an example of a BWP, in accordance with an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
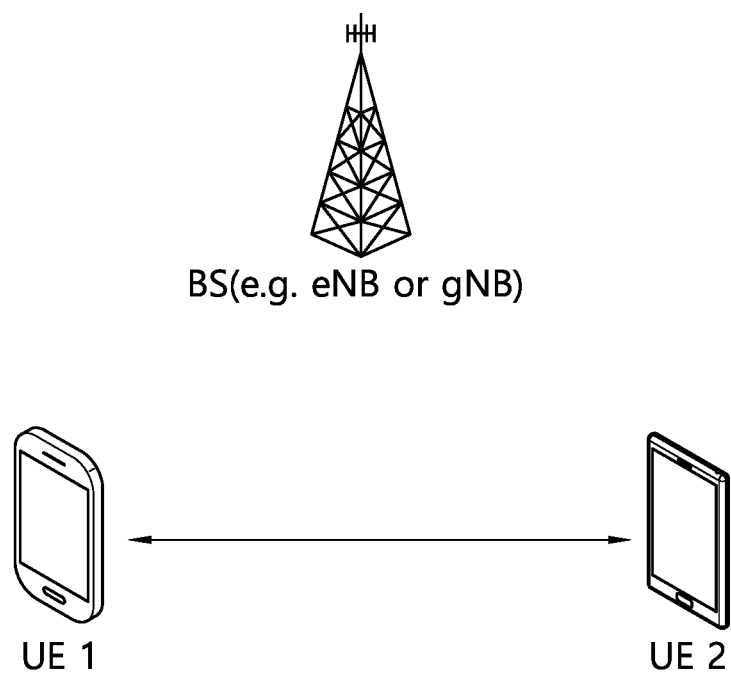
FIG. 7 shows a UE performing V2X or SL communication, in accordance with an embodiment of the present disclosure.

FIG. 7 shows a UE performing V2X or SL communication, in accordance with an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
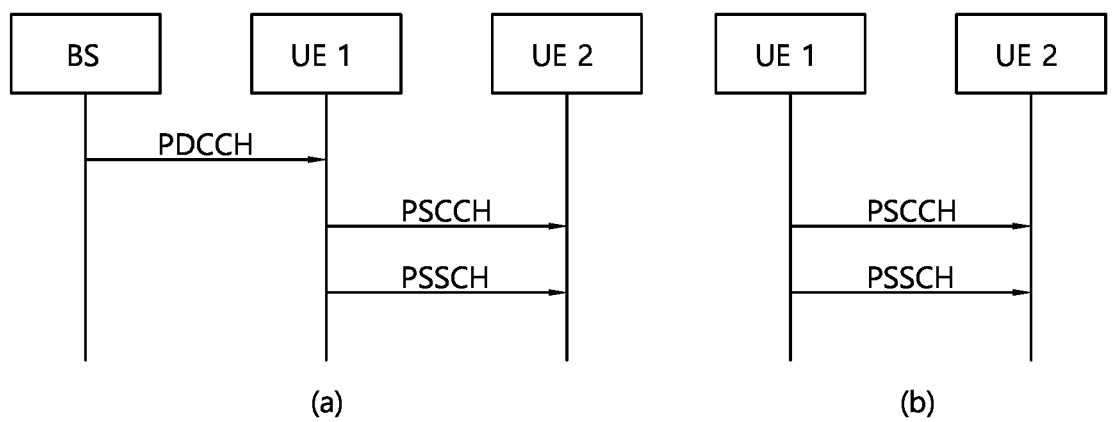
FIG. 8 shows a procedure of performing V2X or SL communication by a UE based on a transmission mode, in accordance with an embodiment of the present disclosure.

FIG. 8 shows a procedure of performing V2X or SL communication by a UE based on a transmission mode, in accordance with an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
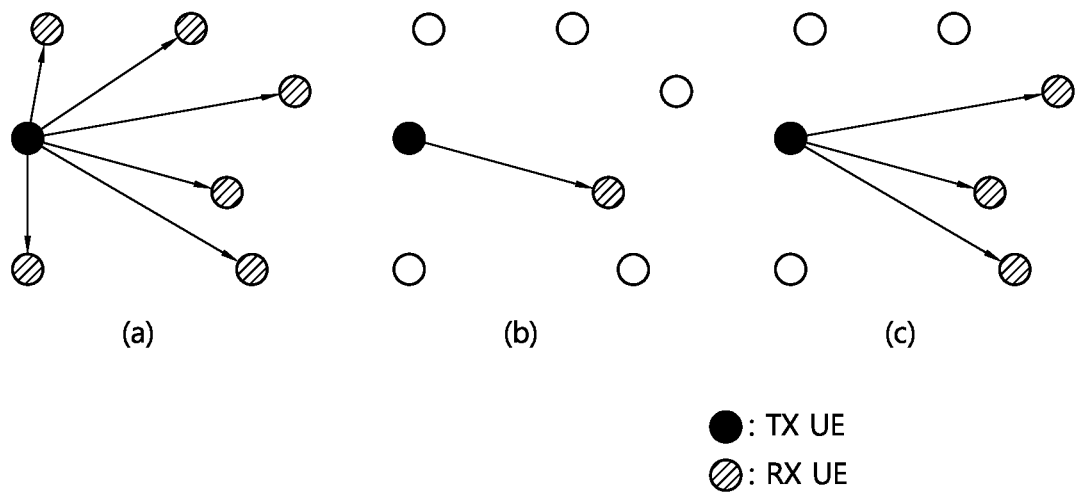
FIG. 9 shows three cast types, in accordance with an embodiment of the present disclosure.

FIG. 9 shows three cast types, in accordance with an embodiment of the present disclosure. The embodiment of FIG. 9 may be combined with various embodiments of the present disclosure. Specifically, FIG. 9(a) shows broadcast-type SL communication, FIG. 9(b) shows unicast type-SL communication, and FIG. 9(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, according to the prior art, when a UE has sidelink data to be transmitted to another UE and uplink data to be transmitted to a base station at the same time, and simultaneous transmission is not supported, since only one of the sidelink data or the uplink data can be transmitted, a method of determining transmission priorities for the sidelink data and the uplink data is supported. That is, data having a higher priority is transmitted first through a method of determining transmission priorities for sidelink data and uplink data.

However, there is a problem that the prior art transmission prioritization method cannot be applied in a relay communication environment. For example, a remote UE transmits relay data to be transmitted to a base station (that is, data transmitted from the remote UE to the base station and transmitted to the base station via a relay UE) to the relay UE, and the relay UE may also have its own uplink data (uplink data of the relay UE itself, which is different from the uplink data of the remote UE) at the same time as the relay data. In this case, when the relay UE cannot transmit the relay data and the uplink data to the base station at the same time, only one data or signal of the relay data and the uplink data may be transmitted to the base station. Also, for example, a process of selecting data to be transmitted first by determining transmission priorities among the relay data and the uplink data may need to be supported.

Therefore, in the present disclosure, a method for determining transmission priorities for relay data and uplink data, and a relay UE to preferentially transmit data determined with high priority according to a method for determining transmission priorities among relay data and uplink data are proposed.

According to an embodiment of the present disclosure, a method for determining priorities for a relay UE to determines which data to transmit preferentially when only one of uplink data for transferring relay data and the relay UE's own uplink data can be transmitted may be proposed. For example, the uplink data of the relay UE itself may include HARQ ACK/NACK for a physical downlink shared channel (PDSCH), or a CSI report. In addition, in the proposed prioritization method, in order for a UE to give a higher priority among relay data and the relay UE's own uplink data, a method of comparing a priority value for each of the relay data and the uplink data, and a threshold value (i.e., relay-PrioritizationThreshold) may be proposed. That is, when the priority value of data is lower than the threshold value, the corresponding data can be prioritized, when the priority value of data is higher than the threshold value, the corresponding data can be de-prioritized and another data can be prioritized. For example, the following description may be equally/similarly applied even when the priority is higher as the priority value is greater than the threshold value.

In the present disclosure, a method performed by a base station for determining and delivering a prioritization threshold described or exemplified below to a relay UE (or a remote UE) so that the relay UE can determine transmission priorities between relay data and the relay UE's own uplink data (that is, an uplink signal related to HARQ ACK/NACK for downlink data such as PDSCH or CSI report for Uu link among its own uplink signals transmitted by the relay UE to the base station) is proposed relay-PrioritizationThreshold (or, accesslink-PrioritizationThreshold)

For example, when a relay UE has relay data and uplink data at the same time, and only one of the two data (uplink MAC PDU) can be transmitted to a base station, relay-PrioritizationThreshold may be a threshold value used to determine the priorities of the relay data and the uplink data.

In the transmission priority determination method in the MAC entity between the sidelink MAC PDU (from UE to UE) and the uplink MAC PDU (from UE to gNB) of NR V2X according to the prior art, by comparing the highest priority value among the priority values of logical channels of the sidelink MAC PDU with sl-prioritizationthreshold value, if the priority value is less than the sl-prioritizationthreshold, the sidelink MAC PDU transmission is prioritized. If not, for example, the priority value is higher than the sl-prioritizationthreshold, the sidelink MAC PDU transmission is to be de-prioritized. In addition, even if the highest priority value among priority values of logical channels of a sidelink MAC PDU is smaller than the sl-prioritizationthreshold, when the highest priority value among priority values of logical channels of the uplink MAC PDU is smaller than the ul-prioritizationthreshold, the uplink PDU is always be prioritized than the sidelink MAC PDU. However, in the prior art, priority of a logical channel based on QoS is not supported for a physical signal other than a MAC PDU (e.g., HARQ ACK/NACK or CSI report for PDSCH reception). Accordingly, in the present disclosure, in case an uplink physical signal and relay data without priority of a QoS-based logical channel exist simultaneously in a relay UE, and only one data or signal of the uplink physical signal and the relay data is to be transmitted to the base station, a new threshold value that can be used to enable the relay UE to determine which data has a transmission priority among the two data is defined. For example, the new threshold value may include a relay-PrioritizationThreshold.

According to an embodiment of the present disclosure, by comparing Layer 1 priority value which is indicated by PSCCH(SCI) related to a relay data (e.g., PSSCH received from a remote UE) and relay-PrioritizationThreshold, when the Layer 1 priority value is smaller than the relay-PrioritizationThreshold, a relay UE may prioritize the relay data. That is, when the priority value is smaller than the threshold value, the transmission priority may be assigned. For example, by comparing Layer 1 priority value which is indicated by PSCCH(SCI) related to a relay data (e.g., PSSCH received from a remote UE) and relay-PrioritizationThreshold, when the Layer 1 priority value is higher than the relay-PrioritizationThreshold, a relay UE may prioritize the uplink data. That is, when the priority value is higher than the threshold value, the transmission priority may be assigned to other data.

According to an embodiment of the present disclosure, transmission priority can be decided by comparing a priority value of relay data with sl-PriorityThreshold defined in rel-16 NR sidelink operation (Prioritizations for sidelink and uplink transmissions) rather than relay-PrioritizationThreshold. For example, the above proposed operation using relay-PrioritizationThreshold can be equally applied. That is, when a relay UE regards priority related to an uplink data of a remote UE received through an access link as Layer 1 priority on the SCI, by assuming that the uplink data of the remote UE is sidelink data, rel-16 sl-PriorityThreshold can be reused when collision of the relay UE's own uplink data transmission and the sidelink data is handled. For example, the access link may be a connection between a remote UE and a relay UE.

According to an embodiment of the present disclosure, a transmission priority determination method between relay data and the relay UE's own uplink data may be provided.

In step 1, a remote UE and a relay UE may establish a PC5 unicast link therebetween. In step 2, the remote UE may transmit, to a base station, information of the relay UE which transfers QoS requirements of relay data and the relay data by putting the information into sidelink UE information and transmitting the sidelink UE information to the base station. For example, the QoS requirements may include a packet delay budget, a packet error rate, and the like. For example, the information of the relay UE may include UE identifier information of the relay UE, that is, a Layer 2 source ID of the relay UE.

In step 3, the base station may configure and transmit a threshold value (e.g., relay-PrioritizationThreshold) to the relay UE, that the relay UE can use for prioritization between the relay data and uplink data, based on the QoS requirement information of the relay data delivered by the remote UE and information of the relay UE delivering the relay data to the base station.

In step 4, when the relay data is generated, the remote UE may include a priority value related to the QoS priority of the relay data in a PSCCH (SCI) and transmit it to the relay UE. In step 5, the remote UE may transmit a PSSCH (relay data) to the relay UE.

In step 6, the relay UE may receive the relay data from the remote UE, and also the relay UE itself may generate uplink data to be transmitted to the base station. In step 7, the relay UE may determine transmission priorities between the relay data and the uplink data based on the prioritization threshold value proposed in the present disclosure.

In step 8, the relay UE may check the Layer 1 priority of the relay data included in the PSCCH related to the PSSCH received from the remote UE, and compare the Layer 1 priority of the relay data and the relay-PrioritizationThreshold threshold value. In step 9, the relay UE compares the relay-PrioritizationThreshold with the Layer 1 priority value indicated in the PSCCH (SCI) related to the relay data, and when the Layer 1 priority value is smaller than the relay-PrioritizationThreshold, the relay data may be prioritized. That is, the relay UE may transmit the relay data to the base station first. For example, when a priority value of specific data is smaller than a threshold value, transmission priority may be given to the specific data. If the Layer 1 priority value indicated in the PSCCH (SCI) related to the relay data is compared with the relay-PrioritizationThreshold and the Layer 1 priority value is greater than the relay-PrioritizationThreshold, the uplink data may be prioritized. That is, the relay UE may transmit the uplink data to the base station first. For example, when a priority value of specific data is greater than a threshold value, transmission priority may be given to other data.

Figure 10:
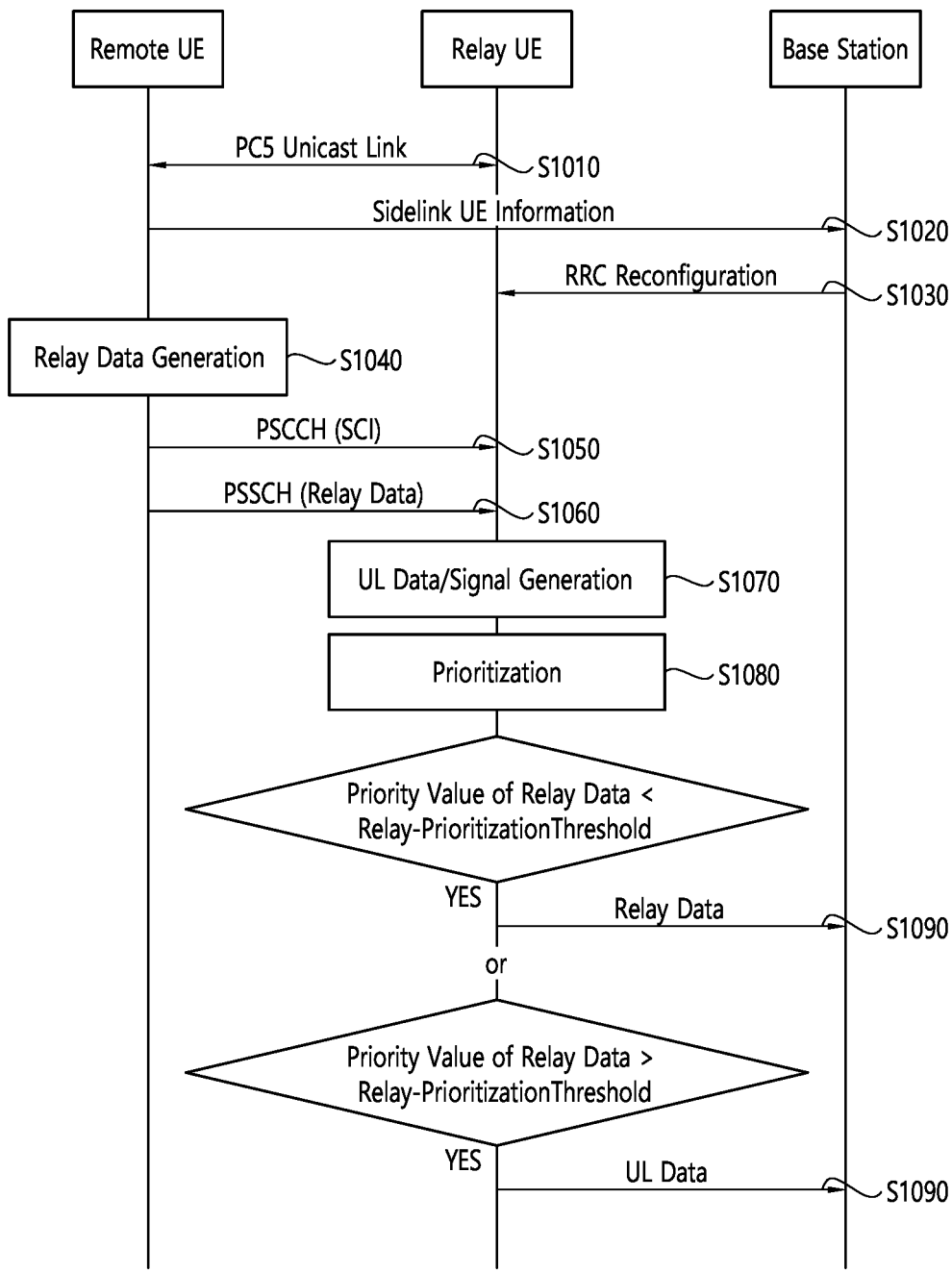
FIG. 10 shows a procedure in which a relay UE performs prioritization of relay data and uplink data/signal according to an embodiment of the present disclosure.

FIG. 10 shows a procedure in which a relay UE performs prioritization of relay data and uplink data/signal according to an embodiment of the present disclosure. The embodiment of FIG. 10 may be combined with various embodiments of the present disclosure.

Referring to FIG. 10, in step S1010, a remote UE may establish a PC5 unicast connection with a relay UE. In step S1020, the remote UE may transmit sidelink UE information to the base station. For example, the sidelink UE information may include quality of service (QoS) information for relay data and information related to the relay UE. In step S1030, the relay UE may receive an RRC reconfiguration message from the base station. For example, the RRC reconfiguration message may include relay-PrioritizationThreshold. For example, the relay-PrioritizationThreshold may be a threshold value related to relay communication. For example, in step S1040, relay data may be generated in the remote UE. For example, the remote UE may generate data to be transmitted through relay communication. In step S1050, the remote UE may transmit a physical sidelink control channel (PSCCH) including sidelink control information (SCI) to the relay UE. For example, the PSCCH and/or the SCI may include a value related to the priority of the generated relay data. In step S1060, the remote UE may transmit a physical sidelink shared channel (PSSCH) including the relay data to the relay UE based on the SCI. For example, the destination of the relay data may be the base station. In step S1070, UL (uplink) data or a signal may be generated in the relay UE. For example, the UL data or the signal may include HARQ ACK/NACK and/or SCI report related to a physical downlink shared channel (PDSCH). In step S1080, the relay UE may determine data to be transmitted to the base station by comparing priorities between the relay data and the UL data. That is, the relay UE can perform prioritization. For example, in step S1090, when the value related to the priority of the relay data is smaller than the relay-PrioritizationThreshold, the relay UE may transmit the relay data to the base station. Or, in step S1090, when the value related to the priority of the relay data is greater than the relay-PrioritizationThrsehold, the relay UE may transmit the UL data or the signal to the base station.

According to an embodiment of the present disclosure, a method of performing prioritization between a relay data and an uplink data when a base station transmits sl-PriorityThreshold-UL-URLLC value to the relay UE is proposed as follows. For example, the sl-PriorityThreshold-UL-URLLC value may represent a threshold value that is used for determining whether a priority of SL V2X transmission, which transfers SL HARQ, or PUCCH transmission has higher priority than an uplink transmission with a priority index 1.

For example, when a base station transfers sl-PriorityThreshold-UL-URLLC threshold to a relay UE, and the relay UE cannot transmit relay data and uplink data at the same time, the relay UE may compare layer 1 priority value of the relay data and sl-PriorityThreshold-UL-URLLC value. For example, the layer 1 priority value of the relay data may be a priority value indicated in a PSCCH (SCI) related to a PSSCH received from a remote UE. When the priority value of the relay data is smaller than the sl-PriorityThreshold-UL-URLLC threshold value, the relay UE may transmit the relay data to the base station earlier than the uplink data by giving transmission priority to the relay data. For example, when a priority value of specific data is smaller than a threshold value, transmission priority may be given to the specific data. If the priority value of the relay data is greater than the sl-PriorityThreshold-UL-URLLC threshold value, the relay UE may give transmission priority to the uplink data to transmit the uplink data to the base station before the relay data. For example, the proposed method can be applied equally/similarly even when the priority is higher as the priority value is greater than the threshold value. For example, when a base station does not transfer sl-PriorityThreshold-UL-URLLC threshold to a relay UE, transmission priority may be determined by comparing priority of data with the relay-PrioritizationThreshold described above.

According to an embodiment of the present disclosure, a method of determining, by a relay UE, transmission priorities of relay data and uplink HARQ, that is, an uplink signal which delivers sidelink HARQ ACK/NACK received from a remote UE to a base station through the following procedure is proposed. For example, in case that the relay UE can transmit only one data or signal among uplink data for transferring the relay data (uplink data for relay data transfer received from the remote UE) and uplink signal (HARQ ACK/NACK) which delivers HARQ ACK/NACK received from the remote UE by the relay UE to the base station, the relay UE may have to determine which data or signal to transmit preferentially. In the present disclosure, a method for a relay UE of giving a higher priority to and transmitting a data or a signal which has smaller priority value, by comparing a priority value of the uplink data for transferring the relay data may be proposed and a priority value of the uplink signal (HARQ ACK/NACK) which delivers the sidelink HARQ ACK/NACK that the relay UE received from the remote UE to the base station. For example, it may be defined that lower priority value means higher priority. For example, the following description may be equally/ similarly applied even when the priority is higher as the priority value is larger.

For example, when a priority value of uplink data for transferring relay data is "3" and a priority value of an uplink signal (HARQ ACK/NACK) which delivers sidelink HARQ ACK/NACK that a relay UE received from a remote UE to a base station is "2", the relay may give a higher priority to transmission of the uplink signal (HARQ ACK/NACK) which delivers sidelink ACK/NACK that the relay UE received from the remote UE to the base station, and transmit the uplink signal (HARQ ACK/NACK) which delivers sidelink ACK/NACK that the relay UE received from the remote UE to the base station first to the base station. For example, conversely, when a priority value of uplink data for transferring relay data is "3" and a priority value of an uplink signal (HARQ ACK/NACK) which delivers sidelink HARQ ACK/NACK that a relay UE received from a remote UE to a base station is "4", the relay UE may give higher priority to transmission of the uplink data for transferring the relay data that the relay UE received from the remote UE, and transmit the uplink data received from the remote UE first to the base station.

According to an embodiment of the present disclosure, a base station may signal time resource region information #A to a relay UE for transmission of Uu data (Uu data in which the relay UE transmits the relay data transmitted by the remote UE to the relay UE to the base station) related to a remote UE, so that the Uu data related to the remote UE could be prioritized than the relay UE's own uplink data. For example, the time resource region information #A may be in the form of a slot-based bitmap. For example, the time resource region information #A may be configured/signaled separately with time resource region information #B for the relay UE's sidelink transmission or sidelink reception and time resource region information #C for the relay UE's own uplink transmission. In addition, for example, the method described in this disclosure, for example, the method of determining transmission priorities between Uu data transmission related to the remote UE and the relay UE's own uplink data transmission may be applied only outside the time specified by the time resource region information #A. That is, the remote UE-related Uu data transmission has the highest priority at a time point designated by time resource region information #A, and a priority-based transmission prioritization method may be applied at other times.

Figure 11:
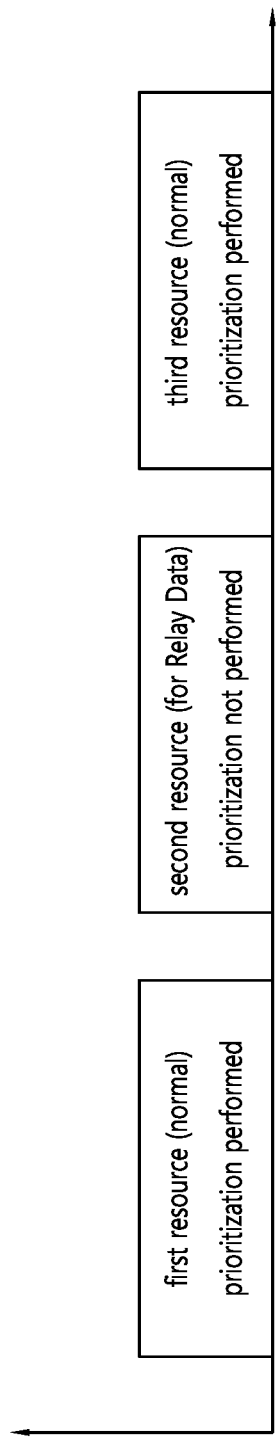
FIG. 11 shows a radio resource only for transmission of relay data, according to an embodiment of the present disclosure.

FIG. 11 shows a radio resource only for transmission of relay data, according to an embodiment of the present disclosure. The embodiment of FIG. 11 may be combined with various embodiments of the present disclosure.

Referring to FIG. 11, a first resource, a second resource, and a third resource configured for a relay UE are represented. For example, the first resource and the third resource may be normal radio resources to which other embodiments described in the disclosure may apply. For example, in the first resource and the third resource, priority comparisons between relay data and UL data can be performed according to other embodiments of the disclosure, and the relay UE may perform transmissions based on the above comparison results. For example, the relay UE may receive the second resource from a base station. The second resource may be a radio resource only for the transmission of the relay data. Based on the second resource, the relay UE may perform the transmission of the relay data regardless of the priority of the relay data.

Meanwhile, the above description is focused on the operation of data transmission prioritization methods using Uu connections between relay data received by relay UE and relay UE's own uplink data, but the above features may also be applied to operation of data transmission prioritization methods by remote UE. That is, the above technical features may be applied to operation of a transmission priority determination method in the event of a collision between relay data transmitted by the remote UE to the relay UE via the sidelink and uplink data transmitted by the remote UE to the base station via the Uu connection.

According to various embodiments of the present disclosure, in case that only one data/signal among an uplink data for transferring relay data that a relay UE received from a remote UE and an uplink data/signal which is generated from the relay UE can be transmitted to a base station, the UE may transmit uplink data/signal with higher priority to the base station first through the proposed transmission priority determination method of the disclosure. For example, the uplink data/signal with higher priority may include uplink data/signal with high QoS requirements.

Figure 12:
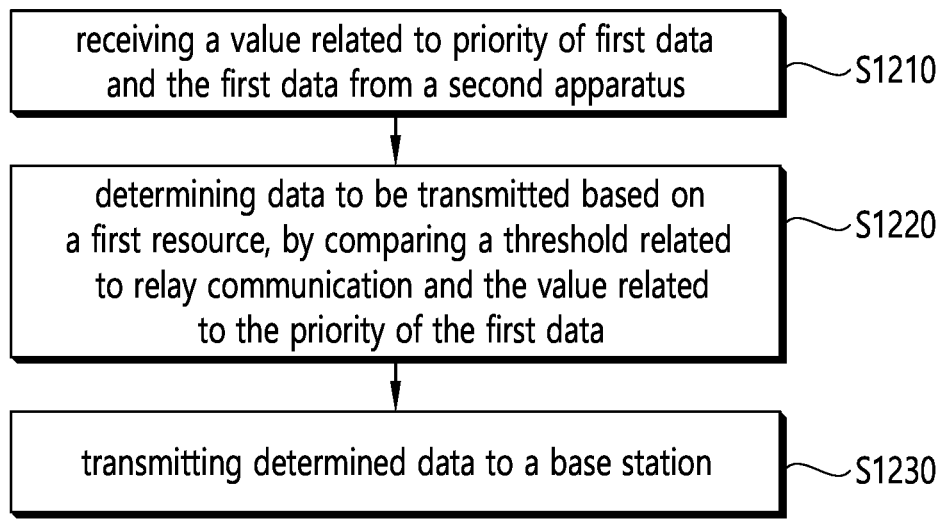
FIG. 12 shows a procedure in which a first device performs wireless communication, according to an embodiment of the present disclosure.

FIG. 12 shows a procedure in which a first apparatus performs wireless communication, according to an embodiment of the present disclosure. The embodiment of FIG. 12 may be combined with various embodiments of the present disclosure.

Referring to the FIG. 12, in step S1210, a first apparatus may receive a value related to priority of first data and the first data from a second apparatus. In step S1220, the first apparatus may determine data to be transferred based on a first resource by comparing a threshold related to relay communication and the value related to the priority of the first data. For example, based on the value related to the priority of the first data smaller than the threshold, the first data may be determined to be transmitted, and based on the value related to the priority of the first data greater than the threshold, the second data may be determined to be transmitted. In step S1230, the first apparatus may transmit the determined data a base station.

For example, additionally, the first apparatus may receive information related to a second resource from the base station; and transmit the first data to the base station based on the second resource.

For example, based on the second resource, the first data may be transmitted regardless of the priority of the first data.

For example, based on the second resource, the second data may not be transmitted regardless of the priority of the first data.

For example, the priority of the first data may be priority of a logical channel with the highest priority among logical channels related to generation of a medium access control (MAC) protocol data unit (PDU) related to the first data.

For example, the second data may be data related to hybrid automatic repeat request (HARQ) feedback for a physical downlink shared channel (PDSCH).

For example, the second data may be data related to a channel state information (CSI) report.

For example, the second data may not include priority of a logical channel related to quality of service (QoS).

For example, the second data may be data generated from the first apparatus.

For example, the value related to the priority of the first data may be received through sidelink control information (SCI) related to the first data.

For example, additionally, the first apparatus may receive the threshold related to the relay communication from the base station.

For example, the threshold related to the relay communication may be configured based on QoS requirement information related to the first data and information related to the first apparatus.

For example, the threshold may be a threshold related to sidelink communication or ultra reliable low latency communication (URLLC).

The above described embodiment may be applied to various apparatuses described below. For example, a processor 102 of a first apparatus 100 may control a transceiver 106 to receive a value related to priority of first data and the first data from a second apparatus 200. And, the processor 102 of the first apparatus 100 may determine data to be transmitted based on a first resource by comparing threshold related to relay communication and the value related to the first data. And, the processor 102 of the first apparatus 100 may control the transceiver 106 to transmit the determined data to a base station 300.

According to an embodiment of the present disclosure, a first apparatus for performing wireless communication may be provided. For example, the first apparatus may comprise one or more memories storing instructions; one or more transceivers; and one or more processors connected to the one or more memories and the one or more transceivers. For example, the one or more processors execute the instructions to: receive a value related to priority of first data and the first data from a second apparatus; determine data to be transmitted based on a first resource, by comparing a threshold related to relay communication and the value related to the priority of the first data, wherein the first data is determined to be transmitted, based on the value related to the priority of the first data which is smaller than the threshold, and wherein second data is determined to be transmitted, based on the value related to the priority of the first data which is greater than the threshold; and transmit the determined data to a base station.

According to an embodiment of the present disclosure, an apparatus configured to control a first user equipment (UE) may be supported. For example, the apparatus may comprise one or more processors; and one or more memories operably connectable to the one or more processors and storing instructions. For example, wherein the one or more processors execute the instructions to: receive a value related to priority of first data and the first data from a second UE; determine data to be transmitted based on a first resource, by comparing a threshold related to relay communication and the value related to the priority of the first data, wherein the first data is determined to be transmitted, based on the value related to the priority of the first data which is smaller than the threshold, and wherein second data is determined to be transmitted, based on the value related to the priority of the first data which is greater than the threshold; and transmit the determined data to a base station.

According to an embodiment of the present disclosure, a non-transitory computer-readable storage medium storing instructions may be supported. For example, the instructions, when executed, cause a first apparatus to: receive a value related to priority of first data and the first data from a second apparatus; determine data to be transmitted based on a first resource, by comparing a threshold related to relay communication and the value related to the priority of the first data, wherein the first data is determined to be transmitted, based on the value related to the priority of the first data which is smaller than the threshold, and wherein second data is determined to be transmitted, based on the value related to the priority of the first data which is greater than the threshold; and transmit the determined data to a base station.

Figure 13:
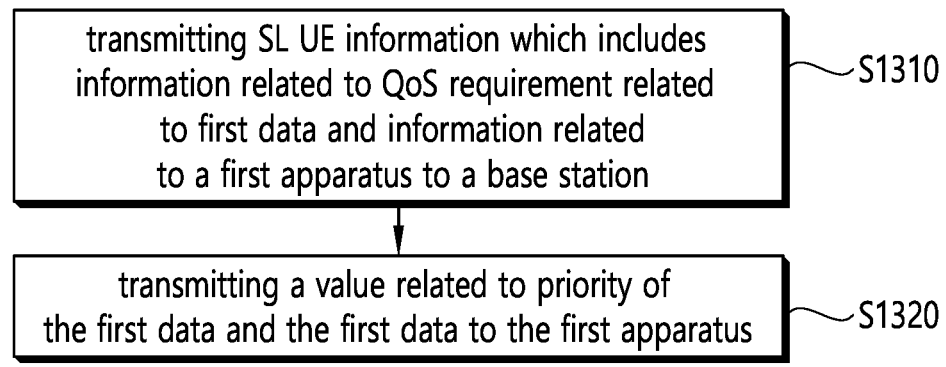
FIG. 13 shows a procedure in which a second device performs wireless communication, according to an embodiment of the present disclosure.

FIG. 13 shows a procedure in which a second device performs wireless communication, according to an embodiment of the present disclosure. The embodiment of FIG. 13 may be combined with various embodiments of the present disclosure.

Referring to the FIG. 13, in step S1310, a second apparatus may transmit sidelink (SL) user equipment (UE) information which includes information related to quality of service (QoS) requirement related to first data and information related to a first apparatus to a base station. In step S1320, the second apparatus may transmit a value related to priority of the first data and the first data to the first apparatus. For example, data to be transmitted based on a first resource to the base station is determined by comparing a threshold related to relay communication and the value related to the priority of the first data among the first data and second data.

For example, the first apparatus receives information related to a second resource from the base station, and based on the second resource, the first data is transmitted to the base station regardless of the priority of the first data.

The above described embodiment may be applied to various apparatuses described below. For example, a processor 202 of a second apparatus 200 may control a transceiver 206 to transmit sidelink (SL) user equipment (UE) information which includes information related to quality of service (QoS) requirement related to first data and information related to a first apparatus 100 to a base station 300. And, the processor 202 of the second apparatus 200 may control the transceiver 206 to transmit a value related to priority of the first data and the first data to the first apparatus 100.

According to an embodiment of the present disclosure, a second apparatus for performing wireless communication may be provided. For example, the second apparatus may comprise one or more memories storing instructions; one or more transceivers; and one or more processors connected to the one or more memories and the one or more transceivers. For example, the one or more processors execute the instructions to: transmit sidelink (SL) user equipment (UE) information which includes information related to quality of service (QoS) requirement related to first data and information related to a first apparatus to a base station; and transmit a value related to priority of the first data and the first data to the first apparatus, wherein data to be transmitted based on a first resource to the base station is determined by comparing a threshold related to relay communication and the value related to the priority of the first data among the first data and second data.

For example, the first apparatus receives information related to a second resource from the base station, and based on the second resource, the first data is transmitted to the base station regardless of the priority of the first data.

On the other hand, according to the prior art, when a UE has sidelink data to be transmitted to another UE and uplink data to be transmitted to a base station at the same time, and simultaneous transmission is not supported, since only one of the two data can be transmitted, method of determining transmission priorities for sidelink data and uplink data is supported. That is, according to the prior art, data having a higher priority may be transmitted first through a method of determining transmission priorities for sidelink data and uplink data.

However, there is a problem that the conventional transmission prioritization method cannot be applied to a relay communication environment. For example, when a remote UE transmits relay data to be transferred to a base station to relay UE, the relay UE may have the relay data received from the remote UE which the relay UE have to transfer to the base station (e.g., uplink data of the remote UE) and the relay UE's own uplink data at the same time. For example, the relay UE's own uplink data may include the relay UE's own uplink data which doesn't correspond to the uplink data of the remote UE. In this case, if simultaneous transmission of relay data and uplink data is not supported in the relay UE, only an uplink MAC PDU for one of relay data and uplink data may be transmitted to the base station. For example, the case if the simultaneous transmission of relay data and uplink data is not supported may include a case that multiplexing of relay data and uplink data at one uplink MAC PDU is not supported. Even if it is possible for the relay UE to transmit the relay data and the uplink data through one uplink MAC PDU (that is, in case that multiplexing of relay data and uplink data in one uplink MAC PDU is supported), in case that the relay data and the uplink data are not able to be accommodated at an uplink grant which is allocated to the UE from a base station, a case that only one of the relay data and the uplink data can be transmitted may occur.

In order to solve the above-mentioned problem, a method of determining the transmission priorities for relay data and uplink data at the relay UE may need to be supported. However, according to the prior art, this method is not supported.

Therefore, in the present disclosure, by providing a method for determining the transmission priorities for relay data and uplink data, a method for the relay UE to transmit data with highly determined priority in the prioritization method among relay data and uplink data is proposed According to an embodiment of the present disclosure, a prioritization method for determining which data to transmit preferentially when a relay UE can transmit only one of uplink data for relaying relay data and uplink data of the relay UE itself is proposed. In addition, according to the present disclosure, a threshold value used to determine data to be given high priority among relay data (i.e., uplink data; uplink MAC PDU which includes relay data) and uplink data (that is, the relay UE's own uplink data which the relay transmits to the base station) in the proposed prioritization method is newly defined. For example, the threshold value may include relay-PrioritizationThreshold and/or ul-PrioritizationThreshold. That is, according to an embodiment of the present disclosure, a method that causes a relay UE to transmit an uplink MAC PDU with highly determined priority first through prioritization method to a base station is proposed.

According to an embodiment of the present disclosure, so that a relay UE can determine transmission priorities between relay data and uplink data, a base station may determine and deliver the following priority threshold to a relay UE or a remote UE.

1. relay-PrioritizationThreshold

For example, relay-PrioritizationThreshold may be a threshold used for prioritization of relay data, when a relay UE has the relay data and uplink data at the same time and only one of the two data can be transmitted to a base station. For example, although the relay data is uplink data, an uplink MAC PDU including relay data, relay data, and uplink data may all be included in the uplink MAC PDU transmitted by relay UE to base station.

According to an embodiment of the present disclosure, when the highest priority value of logical channel of relay data in a relay UE is smaller than relay-PrioritizationThreshold, the relay data may be prioritized. For example, the highest priority of the logical channel may be the highest priority among priorities of logical channels of an uplink MAC PDU for relay data, or the highest priority among priorities of logical channels related to relay data. That is, for example, the highest priority of logical channel may be a value of the highest priority among the priority values of the logical channels in the uplink MAC PDU including the relay MAC PDU. For example, that the relay data is prioritized may mean transmitting the relay data in case only one of data can be transmitted.

Conversely, if the highest priority value of logical channel related to relay data is greater than relay-PrioritizationThreshold, the relay data may be de-prioritized. For example, that the relay data is de-prioritized may mean transmitting uplink data in case only of data can be transmitted.

2. ul-PrioritizationThreshold

For example, ul-PrioritizationThreshold is used to determine priority of uplink data when a relay UE has relay data and uplink data at the same time, and can transmit only one of the two data to the base station may be a threshold value.

According to an embodiment of the present disclosure, a relay UE may prioritize uplink data when a value of the highest priority of logical channels related to the uplink data is smaller than ul-PrioritizationThreshold. Conversely, the relay UE may de-prioritize the uplink data when a value of the highest priority of logical channels related to relay data is greater than ul-PrioritizationThreshold.

The embodiment described below shows an example of uplink data transmission of a relay UE to which a prioritization method between relay data and uplink data is applied.

In step 1, a PC5 unicast connection between a remote UE and a relay UE may be established. In step 2, the remote UE may transmit, to a base station, QoS requirements of relay data and information of the relay UE that delivers the relay data to the base station by including in sidelink UE information. For example, the relay data may include user data that the remote UE intends to transmit to the base station through the relay UE. For example, the QoS requirements of the relay data may include a packet delay budget, a packet error rate, and the like. For example, the information of the relay UE may include UE identifier information of the relay UE, that is, a Layer 2 source ID of the relay UE.

In step 3, the base station may configure and transmit to the relay UE a threshold which can be used by the relay UE to perform prioritization between the relay data and the uplink data, based on information of the relay UE which transfers the QoS requirement information of the relay data that the remote UE transmits and the relay data to the base station. For example, the threshold may include ul-PrioritizationThreshold and relay-PrioritizationThreshold.

In step 4, the remote UE may transfer logical channel information related to the relay data, priority related to the logical channel, source (source address: source Layer 2 address)/destination (destination address: destination Layer 2 address) information of the relay data, etc by including them in a PC5 RRC message to the relay UE when the relay data is generated. For example, the logical channel information may include a logical channel ID or a logical channel group ID. For example, step 4 may be executed after step 5. Or, alternatively, the remote UE may transfer the logical channel information related to the relay data, priority related to the logical channel, source/destination information of the relay data, etc to the remote UE by including them in SCI(PSCCH) related to the relay data (PSSCH) or a PC 5 MAC control element (CE) when the relay data is generated.

In step 5, the remote UE may transmit the relay data to the relay UE. In step 6, the relay UE may receive the relay data from the remote UE, and uplink data that the relay UE itself transfers to the base station may be generated.

In step 7, the relay UE may perform prioritization between the relay data and the uplink data based on the prioritization threshold proposed in the present disclosure. In step 8, the relay UE may compare the highest priority value among logical channels of uplink MAC PDU for the generated uplink data and ul-PrioritizationThreshold configured from the base station. If the highest priority value among logical channels of uplink MAC PDU is smaller than ul-PrioritizationThreshold, uplink MAC PDU for the uplink data is prioritized, the relay UE may transmit the uplink MAC PDU for the uplink data rather than the relay data first to the base station.

In step 9, the relay UE may compare the highest priority value among logical channels of uplink MAC PDU for transmitting the relay data received from the remote UE to the base station and relay-PrioritizationThreshold configured from the base station. The relay UE may obtain the highest priority value among logical channels of uplink MAC PDU for transmitting the relay data to the base station, based on the logical channel information related to the relay data and the source/destination information of the relay data received in the step 4 from the remote UE. If the highest priority value among logical channels of uplink MAC PDU for transmitting the relay data received from the remote UE to the base station is smaller than relay-PrioritizationThreshold, the relay data may be prioritized. In this case, the relay UE may not immediately transmit the relay data to the base station even if the relay data is prioritized, and may transmit the relay data to the base station only when the following conditions are further satisfied. For example, the relay UE may compare the highest priority value among logical channels of uplink MAC PDU for the generated uplink data and ul-PrioritizationThreshold configured by the base station. If the highest priority value among logical channels of uplink MAC PDU is greater than ul-PrioritizationThreshold, the uplink MAC PDU for the uplink data may be de-prioritized and the relay UE may transmit the pre-prioritized relay data to the base station first.

Figure 14:
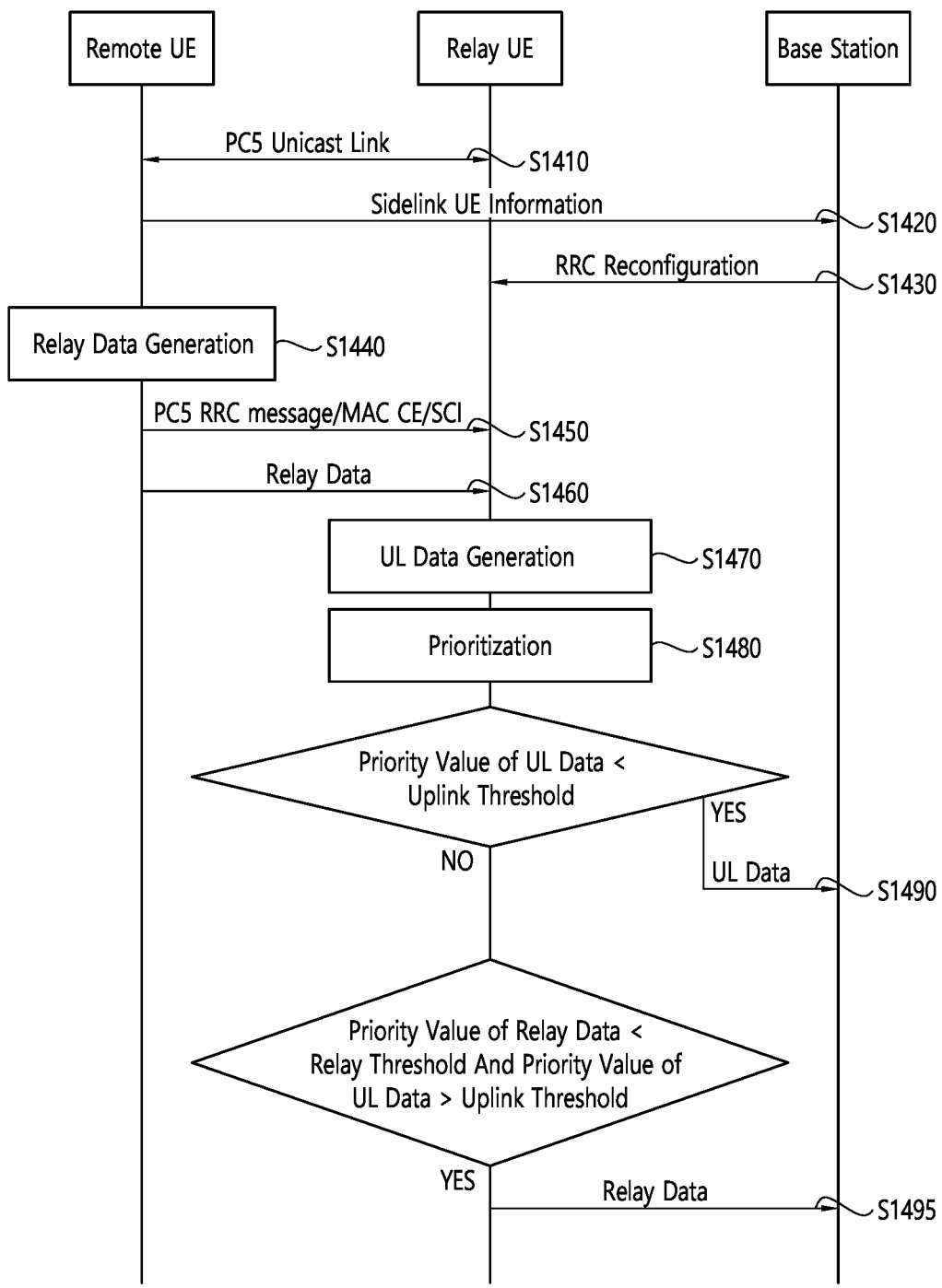
FIG. 14 shows a procedure in which a relay UE performs prioritization of relay data and uplink data according to an embodiment of the present disclosure.

FIG. 14 shows a procedure in which a relay UE compares priorities of relay data and uplink data according to an embodiment of the present disclosure. The embodiment of FIG. 14 may be combined with various embodiments of the present disclosure.

Referring to FIG. 14, in step S1410, a remote may establish a PC5 unicast connection with a relay UE. In step S1420, the remote UE may transmit sidelink UE information to a base station. For example, the sidelink UE information may include QoS information for relay data and information related to relay UE. In step S1430, the relay UE may receive RRC reconfiguration message from the base station. For example, the RRC reconfiguration message may include thresholds of the relay data and the uplink data for prioritization. For example, in step S1440, relay data may be generated at the remote UE. For example, the remote UE may generate data to be transmitted through relay communication. In step S1450, the remote UE may transmit PC5 RRC message, MAC control element (CE), or SCI to the relay UE. For example, the remote UE may transmit logical channel information related to the relay data, priority value related to the logical channel through at least one of the PC5 RRC message, the MAC CE, or the SCI. In S1460, the remote UE may transmit the relay data to the relay UE. For example, the relay data' destination may be the base station. In step S1470, UL data may be generated at the relay UE. In step S1480, the relay UE may determine data to transmit to the base station by comparing priorities between the relay data and the UL data. That is, the relay UE may perform prioritization. For example, In S1490, a value related to the priority of the UL data is smaller than threshold of the UL data, the relay UE may transmit the UL data to the base station. For example, after comparison in the step S1490, the value of the priority of the UL data is not smaller than the threshold of the UL data, in step S1495, if the value related to the priority of the relay data is smaller than the threshold of the relay data, and the value related to the UL data is greater than the threshold of the UL data, the relay UE may transmit the relay data to the base station.

According to an embodiment of the present disclosure, a base station may signal time resource region information #A to relay UE for Uu data transmission related to remote UE so that transmission of Uu data related to the remote UE is prioritized than transmission of the relay UE's own uplink data. For example, the time resource region information #A may be in the form of a slot-based bitmap. For example, the Uu data related to the remote UE may include Uu data for the relay UE to transmit relay data, which the remote UE transmitted to the relay UE, to a base station. For example, the time resource region information #A may be configured/signaled separately from time resource region information #B for sidelink transmission or sidelink reception of the relay UE, and time resource region information #C for the relay UE's own uplink transmission. Furthermore, for example, the method described in the present disclosure may be applied to determine the transmission priorities between the remote UE-related Uu data transmission and the relay UE's own uplink data transmission only outside the time resource region information #A. That is, for example, a period specified by time resource region information #A may be a period where the transmission of the Uu data related to the remote UE is prioritized, and priority-based transmission prioritization method may be applied out of the period.

On the other hand, the above description has been mainly described for the operation of the method of determining the priority of data transmission using the Uu connection between relay data received by a relay UE from a remote UE and uplink data of the relay UE itself, but the above-described technical features may also be applied to the operation of a method for prioritizing inter-data transmission of a remote UE. In other words, the above-described method can be applied to the behavior of how data is prioritized in the event of a collision between relay data transmitted by a remote UE to a relay UE over a sidelink and uplink data transmitted by the remote UE to a base station over a Uu connection.

According to various embodiments of the present disclosure, in case that only one MAC PDU for data among uplink data for transferring relay data that a relay UE received from a remote UE and uplink data generated from the relay UE can be transmitted to a base station, by causing the relay UE to determine uplink data with higher priority, data with high QoS requirement can be transmitted first. For example, the uplink data with higher priority may include uplink data of high QoS requirement.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
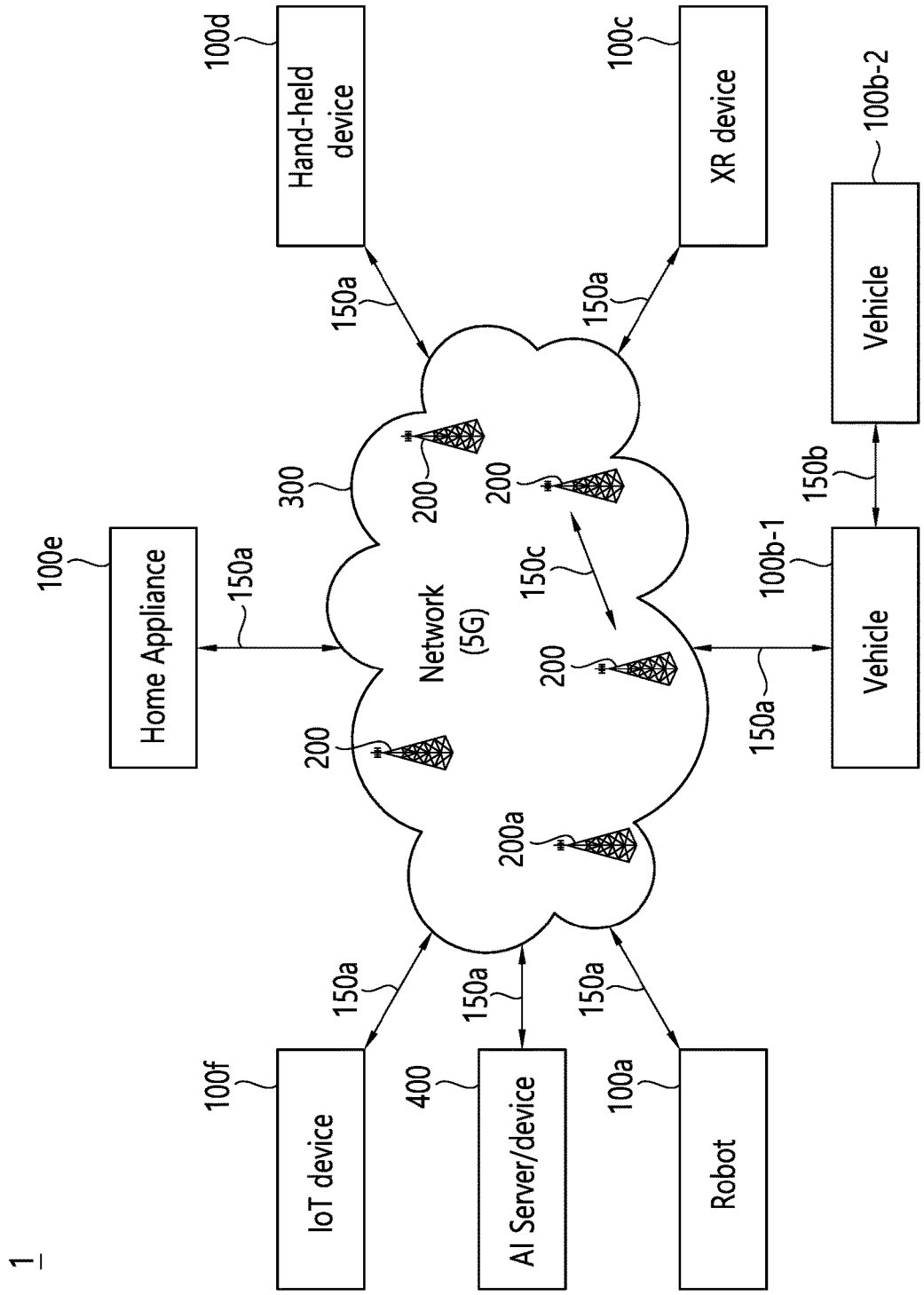
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
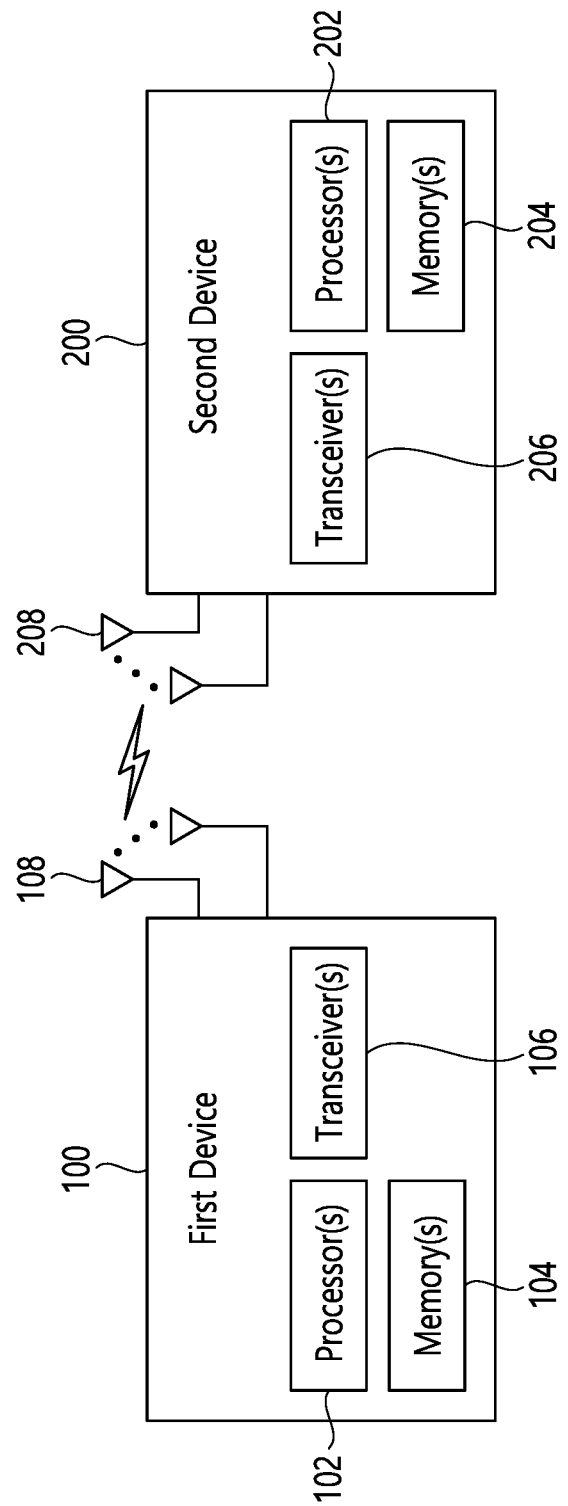
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
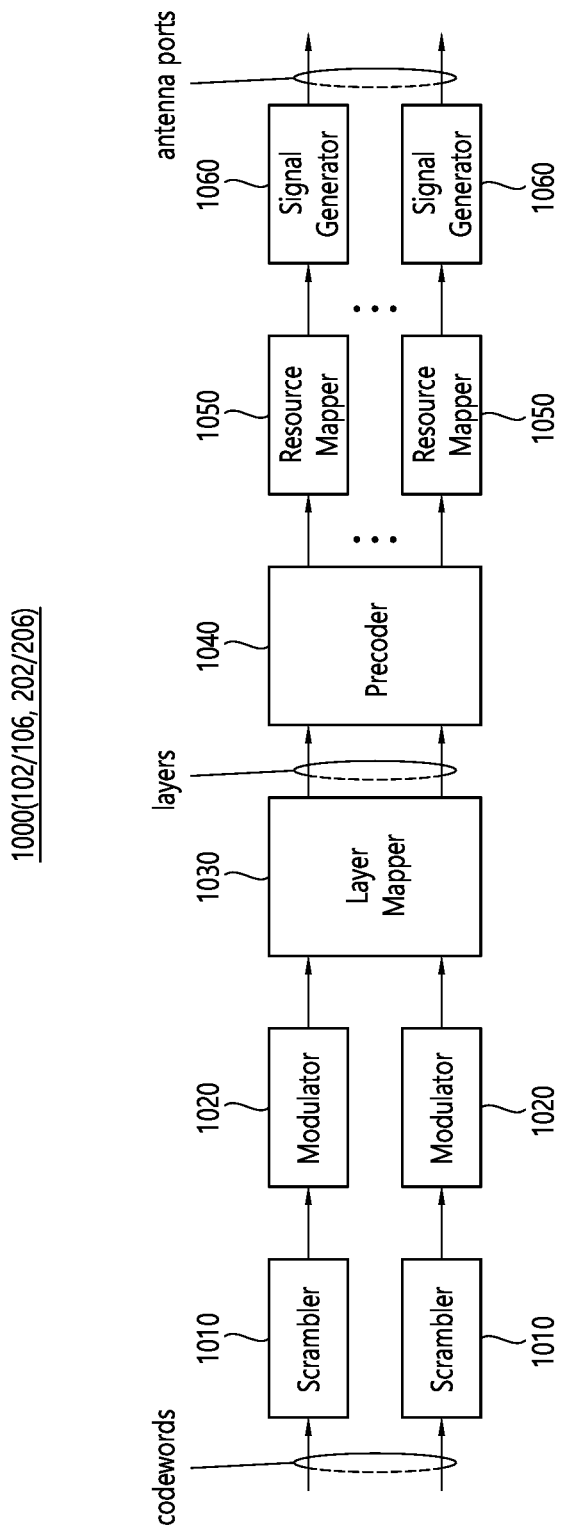
FIG. 17 shows a signal process circuit for a transmission signal, in accordance with an embodiment of the present disclosure.

FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
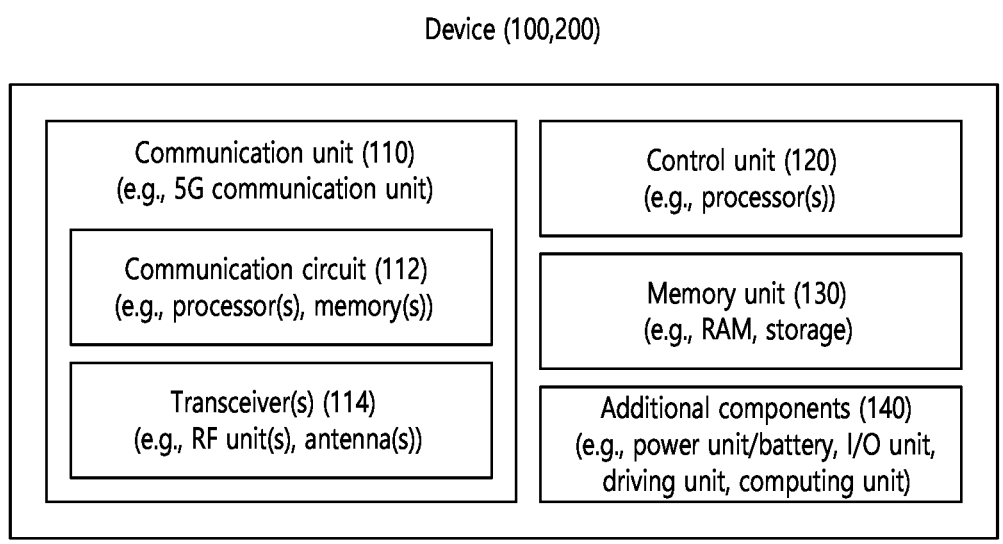
FIG. 18 shows another example of a wireless device, in accordance with an embodiment of the present disclosure.

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
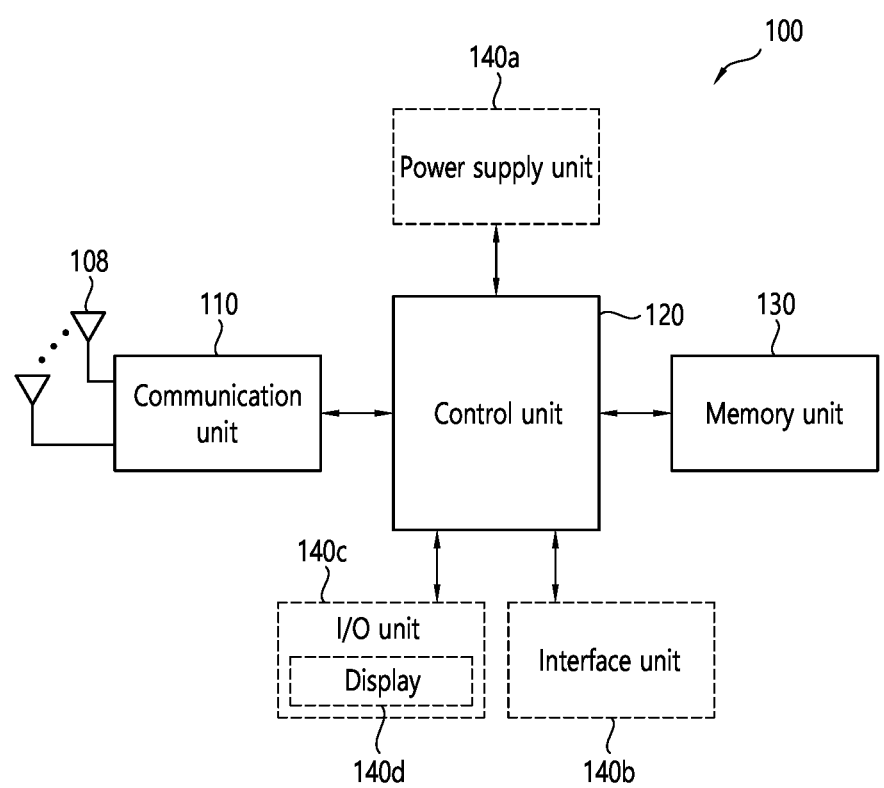
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
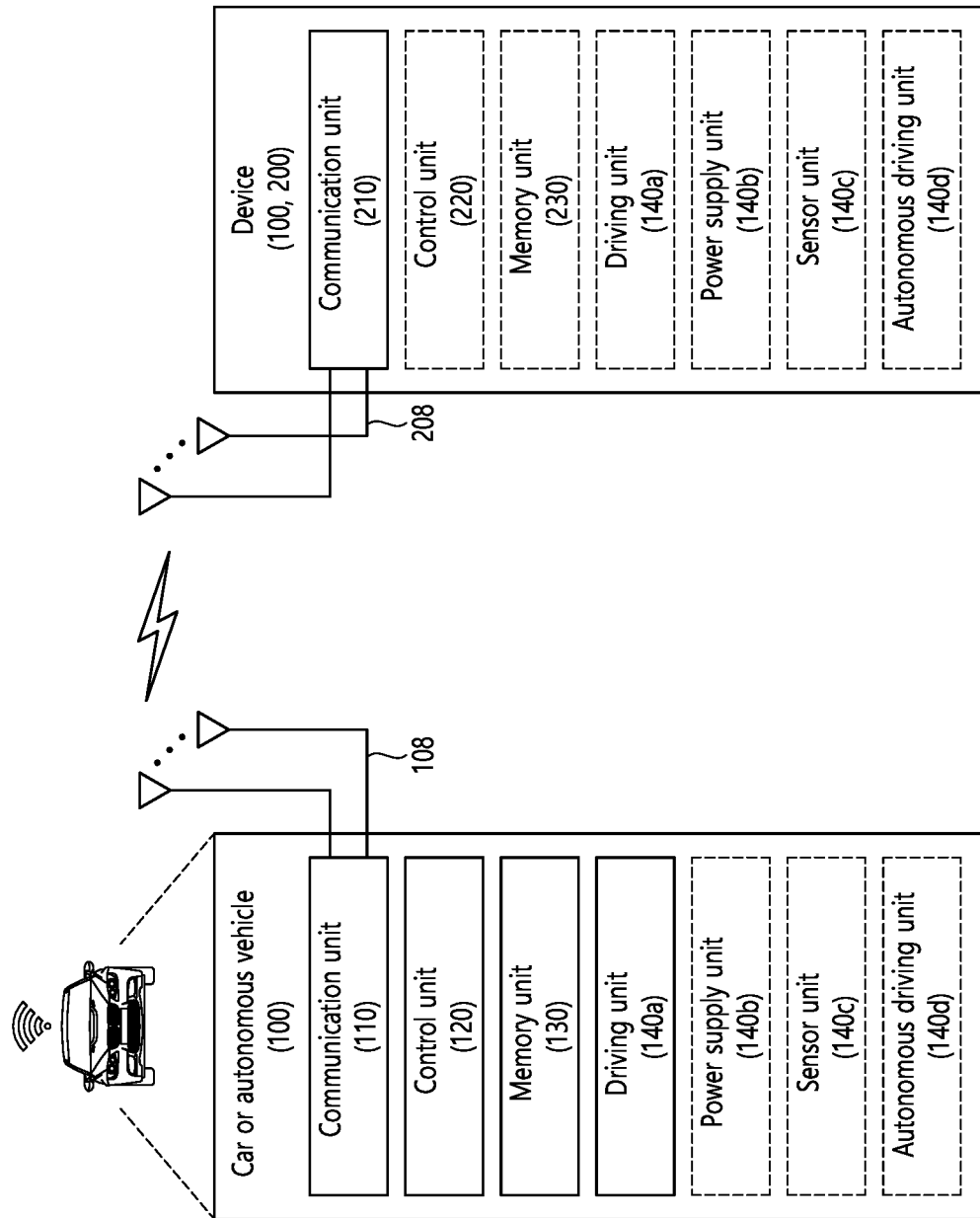
FIG. 20 shows a vehicle or an autonomous vehicle, in accordance with an embodiment of the present disclosure.

FIG. 20 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a first apparatus to perform wireless communication, the method comprising:
    receiving information related to a first resource and a second resource from a base station;
    establishing a PC5 unicast connection with a second apparatus;
    receiving a threshold related to relay communication from the base station;
    receiving first data whose transmission overlaps a transmission of second data and a value related to a priority of the first data from the second apparatus, through a physical sidelink control channel (PSCCH) and a physical sidelink shared channel (PSSCH);
    based on that the first data or the second data is to be transmitted on the first resource, determining which data is to be transmitted among the first data and the second data, by comparing the threshold and the value related to the priority of the first data,
    wherein the first data is determined to be transmitted, based on the value related to the priority of the first data being smaller than the threshold, and
    wherein the second data is determined to be transmitted, based on the value related to the priority of the first data being greater than the threshold;
    based on that the first data or the second data is to be transmitted on the second resource, determining that the first data is to be transmitted among the first data and the second data, regardless of the priority of the first data; and
    transmitting the determined data to the base station.

2. The method of claim 1, further comprising:
    based on that the first data or the second data is to be transmitted on the second resource, determining that the second data is not to be transmitted among the first data and the second data, regardless of the priority of the first data.

3. The method of claim 1, wherein the priority of the first data is a priority of a logical channel with a highest priority among logical channels related to generation of a medium access control (MAC) protocol data unit (PDU) related to the first data.

4. The method of claim 1, wherein the second data is related to hybrid automatic repeat request (HARQ) feedback for a physical downlink shared channel (PDSCH).

5. The method of claim 1, wherein the second data is related to a channel state information (CSI) report.

6. The method of claim 1, wherein the second data doesn't include a priority of a logical channel related to quality of service (QoS).

7. The method of claim 1, wherein the second data is generated by the first apparatus.

8. The method of claim 1, wherein the value related to the priority of the first data is received through sidelink control information (SCI) related to the first data.

9. The method of claim 1, wherein the threshold is configured based on QoS requirement information related to the first data and information related to the first apparatus.

10. The method of claim 1, wherein the threshold is related to a sidelink communication or an ultra reliable low latency communication (URLLC).

11. A first apparatus for performing wireless communication, the first apparatus comprising:
    one or more memories storing instructions;
    one or more transceivers; and
    one or more processors operably connected to the one or more memories and the one or more transceivers, wherein the one or more processors execute the instructions to:
    receive information related to a first resource and a second resource from a base station;
    establish a PC5 unicast connection with a second apparatus;
    receive a threshold related to relay communication from the base station;
    receive first data whose transmission overlaps a transmission of second data and a value related to a priority of the first data from the second apparatus, through a physical sidelink control channel (PSCCH) and a physical sidelink shared channel (PSSCH);
    based on that the first data or the second data is to be transmitted on the first resource, determine which data is to be transmitted among the first data and the second data, by comparing the threshold and the value related to the priority of the first data, wherein the first data is determined to be transmitted, based on the value related to the priority of the first data being smaller than the threshold, and wherein the second data is determined to be transmitted, based on the value related to the priority of the first data being greater than the threshold;

based on that the first data or the second data is to be transmitted on the second resource, determine that the first data is to be transmitted among the first data and the second data, regardless of the priority of the first data; and transmit the determined data to the base station.

12. An apparatus configured to control a first user equipment (UE), the apparatus comprising:

one or more processors; and one or more memories operably connectable to the one or more processors and storing instructions, wherein the one or more processors execute the instructions to:

receive information related to a first resource and a second resource from a base station;

establish a PC5 unicast connection with a second UE;

receive a threshold related to relay communication from the base station;

receive first data whose transmission overlaps a transmission of second data and a value related to a priority of the first data from the second UE, through a physical sidelink control channel (PSCCH) and a physical sidelink shared channel (PSSCH);

based on that the first data or the second data is to be transmitted on the first resource, determine which data is to be transmitted among the first data and the second data, by comparing the threshold and the value related to the priority of the first data, wherein the first data is determined to be transmitted, based on the value related to the priority of the first data being smaller than the threshold, and wherein the second data is determined to be transmitted, based on the value related to the priority of the first data being greater than the threshold;

based on that the first data or the second data is to be transmitted on the second resource, determine that the first data is to be transmitted among the first data and the second data, regardless of the priority of the first data; and transmit the determined data to the base station.

* * * * *